(12) United States Patent
Li et al.

(10) Patent No.: US 11,812,073 B2
(45) Date of Patent: *Nov. 7, 2023

(54) IDENTIFYING MEDIA ON A MOBILE DEVICE

(71) Applicant: Google Technology Holdings LLC, Mountain View, CA (US)

(72) Inventors: Renxiang Li, Lake Zurich, IL (US); Kevin L. Baum, Rolling Meadows, IL (US); Faisal Ishtiaq, Chicago, IL (US); Michael L. Needham, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,872

(22) Filed: Oct. 4, 2021

(65) Prior Publication Data

US 2022/0103878 A1 Mar. 31, 2022

Related U.S. Application Data

(63) Continuation of application No. 17/026,917, filed on Sep. 21, 2020, now Pat. No. 11,140,424, which is a
(Continued)

(51) Int. Cl.
*H04N 21/234* (2011.01)
*H04N 21/41* (2011.01)
(Continued)

(52) U.S. Cl.
CPC ... *H04N 21/23418* (2013.01); *H04N 21/4126* (2013.01); *H04N 21/4223* (2013.01);
(Continued)

(58) Field of Classification Search
CPC ......... H04N 21/23418; H04N 21/4126; H04N 21/42203; H04N 21/4223; H04N 21/4394;
(Continued)

(56) References Cited

U.S. PATENT DOCUMENTS 5,612,729 A 3/1997 Ellis et al.
6,246,803 B1 6/2001 Gauch
(Continued)

FOREIGN PATENT DOCUMENTS

CN 102812479 12/2012
EP 1826932 2/2006
(Continued)

OTHER PUBLICATIONS

Bergman, C., "CES: Yahoo Connected TV Knows What You're Watching", available at: http://www.lostremote.com/2011/01/06/yahoo-connected-to-knows-what . . . , last accessed Oct. 10, 2011, Jan. 2011, pp. 1-3.
(Continued)

*Primary Examiner* — Kyu Chae
(74) *Attorney, Agent, or Firm* — Brake Hughes Bellermann LLP

(57) ABSTRACT

Disclosed is a method of associating, at a secondary device, secondary media content with primary media content being output at a primary device. The method includes receiving, at the secondary device, first information based upon the primary content being output at the primary device, wherein the first information includes at least one of an audio and a visual signal, determining at the secondary device second information corresponding to the first information, receiving at the secondary device one or more portions of secondary media content that have been made available by a third device, determining at the secondary device whether one or
(Continued)

more of the portions of the secondary media content match one or more portions of the second information, and taking at least one further action upon determining that there is a match.

19 Claims, 4 Drawing Sheets

Related U.S. Application Data continuation of application No. 16/102,241, filed on Aug. 13, 2018, now Pat. No. 10,785,506, which is a continuation of application No. 15/456,179, filed on Mar. 10, 2017, now Pat. No. 10,051,295, which is a continuation of application No. 13/533,247, filed on Jun. 26, 2012, now Pat. No. 9,628,829.

(51) Int. Cl.
| | |
|---|---|
| *H04N 21/4223* | (2011.01) |
| *H04N 21/44* | (2011.01) |
| *H04N 21/658* | (2011.01) |
| *H04N 21/81* | (2011.01) |
| *H04N 21/8352* | (2011.01) |
| *H04N 21/422* | (2011.01) |
| *H04N 21/439* | (2011.01) |

(52) U.S. Cl.
CPC ... *H04N 21/42203* (2013.01); *H04N 21/4394* (2013.01); *H04N 21/44008* (2013.01); *H04N 21/6581* (2013.01); *H04N 21/8133* (2013.01); *H04N 21/8352* (2013.01)

(58) Field of Classification Search
CPC ......... H04N 21/44008; H04N 21/6581; H04N 21/8133; H04N 21/8352
See application file for complete search history.

(56) References Cited

U.S. PATENT DOCUMENTS

| | | | |
|---|---|---|---|
| 7,509,496 B2 | 3/2009 | Skog et al. | |
| 7,650,616 B2 | 1/2010 | Lee | |
| 7,672,843 B2 | 3/2010 | Srinivasan et al. | |
| 7,793,318 B2 | 9/2010 | Deng | |
| 7,885,904 B2 | 2/2011 | Aravamudan et al. | |
| 7,925,590 B2 | 4/2011 | Jain | |
| 7,930,546 B2 | 4/2011 | Rhoads et al. | |
| 7,933,338 B1 | 4/2011 | Choudhry et al. | |
| 7,983,915 B2 | 7/2011 | Knight et al. | |
| 9,628,829 B2* | 4/2017 | Li | H04N 21/6581 |
| 10,051,295 B2* | 8/2018 | Li | H04N 21/8133 |
| 10,785,506 B2* | 9/2020 | Li | H04N 21/44008 |
| 11,140,424 B2* | 10/2021 | Li | H04N 21/44008 |
| 2002/0093982 A1* | 7/2002 | Joy | H04L 67/306 |
| | | | 370/468 |
| 2002/0104086 A1 | 8/2002 | Tomsen et al. | |
| 2004/0031058 A1 | 2/2004 | Reisman | |
| 2007/0168409 A1 | 7/2007 | Cheung | |
| 2008/0082510 A1* | 4/2008 | Wang | H04H 60/40 |
| 2008/0154401 A1 | 6/2008 | Wang | |
| 2008/0163330 A1 | 7/2008 | Sparrell | |
| 2009/0049465 A1 | 2/2009 | Deng | |
| 2009/0077252 A1 | 3/2009 | Abdo et al. | |
| 2009/0265163 A1 | 10/2009 | Li et al. | |
| 2009/0288131 A1 | 11/2009 | Kandekar et al. | |
| 2010/0281263 A1 | 11/2010 | Ugawa et al. | |
| 2011/0041154 A1 | 2/2011 | Olson | |
| 2011/0063503 A1* | 3/2011 | Brand | H04N 21/4788 |
| | | | 348/E5.009 |
| 2011/0078729 A1* | 3/2011 | LaJoie | G11B 27/28 |
| | | | 707/758 |
| 2011/0087490 A1 | 4/2011 | Olson | |
| 2011/0219419 A1 | 9/2011 | Reisman | |
| 2011/0246495 A1 | 10/2011 | Mallinson | |
| 2011/0289522 A1 | 11/2011 | Pontual et al. | |
| 2011/0289532 A1* | 11/2011 | Yu | H04N 21/41265 |
| | | | 725/38 |
| 2012/0079059 A1 | 3/2012 | Fonseca et al. | |
| 2012/0117584 A1 | 5/2012 | Gordon | |
| 2012/0144418 A1 | 6/2012 | Morris et al. | |
| 2012/0191231 A1 | 7/2012 | Wang | |
| 2012/0227073 A1 | 9/2012 | Hosein et al. | |
| 2012/0266187 A1 | 10/2012 | Deng | |
| 2012/0290740 A1 | 11/2012 | Tewari et al. | |
| 2013/0019258 A1 | 1/2013 | Bhatia et al. | |
| 2013/0074130 A1 | 3/2013 | Robbins et al. | |
| 2013/0212609 A1 | 8/2013 | Sinha et al. | |
| 2013/0326576 A1 | 12/2013 | Zhang et al. | |
| 2015/0319489 A1 | 11/2015 | McMillan | |
| 2016/0112762 A1* | 4/2016 | Mallinson | H04N 21/8133 |
| | | | 725/18 |

FOREIGN PATENT DOCUMENTS

| | | |
|---|---|---|
| WO | WO 2002/011123 | 2/2002 |
| WO | WO 2003/091899 | 11/2003 |
| WO | WO 2008096543 | 8/2008 |

OTHER PUBLICATIONS

Chandrasekhar et al., "Survey and Evaluation of Audio Fingerprinting Schemes for Mobile Query-By-Example Applications" In Proceedings of International Society for Music Information Retrieval Conference, Miami, Florida, US, Oct. 24-Oct. 28, 2011, pp. 1-6.
Dachman, J., "New Civoluation App Links TV with Tablet or Mobile Device", available at: http://sportsvideo.org/main/blog/2011/04/13/new-civolution-app-links-tv . . . , last accessed Oct. 11, 2011, Apr. 2011, pp. 1.
Ellis et al., "Echoprint—An Open Music Identification Service", in Proceedings of International Society for Music Information Retrieval Conference, Miami, Florida, US, Oct. 24-Oct. 28, 2011, available at: http://ismir2011.ismir.net/latebreaking/LB-7.pdf, pp. 1-2.
Haitsma et al., "A Highly Robust Audio Fingerprinting System", IRCAM—Centre Pomidou, Month Unknow 2002, pp. 1-9.
Zeitera, "Zeitera—Video to Video Identification System", available at: http://zeitara.com.press.php, Aug. 2011, lastaccesed Oct. 10, 2011, pp. 1-3.
International Search Report and Written Opinion dated Jan. 22, 2014 in International Patent Application No. PCT/US2013/047694.
IntoNow, "IntoNow—Connect with Your Friends Around the Shows You Love" available at: http://www.intonow.com/ci, last accessed Jun. 25, 2012, Month Unknown, pp. 1-2.
Lawler, R., "Flingo is About to Make Your Smart TV Even Smarter", available at: http://gigaom.com.video/flingo-launch/, last accessed: Jul. 7, 2011, Jul. 2011, pp. 1-8.
Notice of Allowance dated Apr. 13, 2018 in U.S. Appl. No. 15/456,179.
Notice of Allowance dated May 15, 2020 in U.S. Appl. No. 16/102,241.
Notice of Allowance dated Jun. 3, 2021 in U.S. Appl. No. 17/026,917.
Notice of Allowance dated Nov. 18, 2019 in KR Patent Application 10-2015-7001667.
Notice of Allowance dated Dec. 9, 2016 in U.S. Appl. No. 13/533,247.
Office Action dated Jan. 7, 2015 in U.S. Appl. No. 13/533,247.
Office Action dated Mar. 17, 2021 in U.S. Appl. No. 17/026,917.
Office Action dated Apr. 4, 2013 in U.S. Appl. No. 13/533,247.
Office Action dated May 21, 2019 in KR Patent Application No. 10-2015-7001667.
Office Action dated May 22, 2019 in CN Patent Application No. 201380040285.5.
Office Action dated May 30, 2019 in U.S. Appl. No. 16/102,241.
Office Action dated Jun. 8, 2016 in U.S. Appl. No. 13/533,247.
Office Action dated Sep. 5, 2018 in CN Patent Application No. 201380040285.5.
Office Action dated Sep. 26, 2017 in U.S. Appl. No. 15/456,179.

(56) References Cited

OTHER PUBLICATIONS

Office Action dated Oct. 29, 2020 in U.S. Appl. No. 17/026,917.
Office Action dated Oct. 30, 2017 in U.S. Appl. No. 15/456,179.
Office Action dated Nov. 15, 2013 in U.S. Appl. No. 13/533,247.
Office Action dated Nov. 29, 2018 in U.S. Appl. No. 16/102,241.
Office Action dated Nov. 29, 2019 in U.S. Appl. No. 16/102,241.
Office Action dated Dec. 17, 2015 in U.S. Appl. No. 13/533,247.
Soundhound, SoundHound—Instant Music Search and Discovery, available at: http://www.soundcloud.com, last accessed Jun. 25, 2012, Month Unknown 2011, pp. 1-2.
Stojancic, M., "Audio-Video Content Fingerprinting for Smart TV and Synchronous Mobile Content Identification", Zeitera, LLC, Jun. 28, 2011, pp. 1-50.
Wang, Avery L.C., "An Industrial-Strength Audio Search Algorithm", In Proceedings of 2003 ISMIR International Symposium on Music Information Retrieval, Baltimore, Maryland, US, Oct. 2003, pp. 1-7.

\* cited by examiner

IDENTIFYING MEDIA ON A MOBILE DEVICE

CROSS-REFERENCE TO RELATED APPLICATIONS

This application is a continuation of U.S. patent application Ser. No. 17/026,917, filed Sep. 21, 2020, which is a continuation of U.S. patent application Ser. No. 16/102,241, filed Aug. 13, 2018, which is a continuation of U.S. patent application Ser. No. 15/456,179, filed Mar. 10, 2017, which is a continuation of U.S. patent application Ser. No. 13/533,247, filed Jun. 26, 2012, each of which is hereby incorporated by reference herein in its entirety.

TECHNICAL FIELD

The present invention is related generally to identifying media content and, more particularly, to identifying data signatures associated with media content.

BACKGROUND

With the advent of mobile devices, there has arisen an opportunity for a viewer of media content on one media device, such as a television, to utilize a mobile device to obtain additional information related to the media content being viewed. At least some conventional arrangements employ a "feedback-based process" in which a mobile device obtains a sample of the media content output by the media device, uploads the sample to a server that compares the sample to all recorded media channels to identify the media content being viewed, and then ultimately receives back from the server pertinent additional information related to the media content being viewed. When countless mobile-device users are simultaneously using such an identification service, the server can be overloaded with requests, resulting in slow response and a potential disruption of the service.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
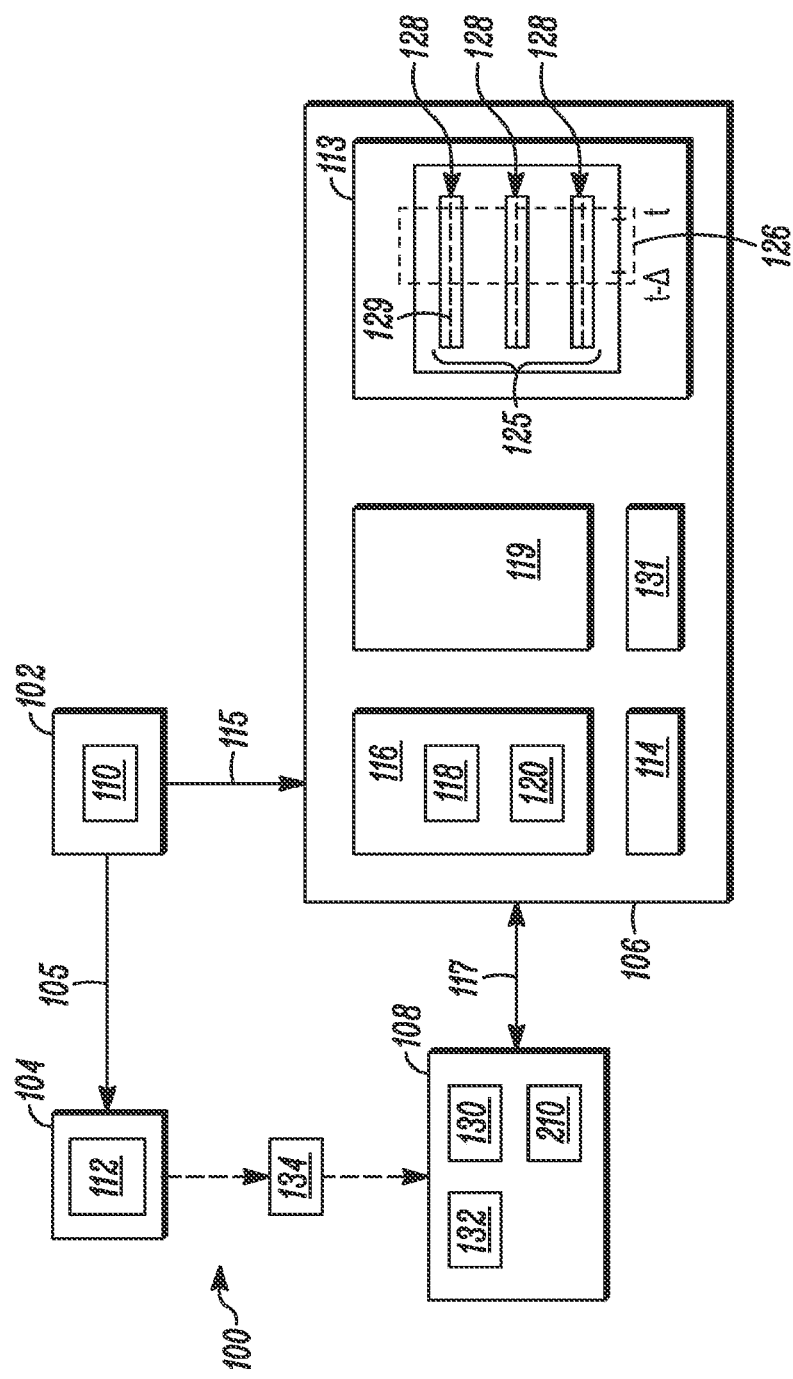
FIG. 1 is a block diagram of an exemplary communication system in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

According to aspects of the present disclosure, secondary media content is associated with primary media content being output at a primary device. An exemplary method includes receiving, at a secondary device, first information based upon the primary content being output at the primary device, wherein the first information includes at least one of an audio and a visual signal, determining at the secondary device second information corresponding to the first information, receiving at the secondary device one or more portions of secondary media content that have been made available by a third device, determining at the secondary device whether one or more of the portions of the secondary media content match one or more portions of the second information, and taking at least one further action upon determining that there is a match.

In another aspect, a mobile device includes a memory device configured to store one or more portions of a data signature generated based upon one or more portions of primary content being output by an additional device distinct from the mobile device, a wireless transceiver configured to receive communication signals originating at a server computer, the communication signals including one or more portions of secondary media content, and a processing device coupled at least indirectly to each of the memory device and the wireless transceiver, the processing device configured to determine whether the one or more portions of the secondary media content match one or more portions of the data signature, wherein the mobile device is further configured to take at least one action upon determining that there is a match.

In still another aspect, secondary media content is associated with primary media content being output at a primary device. An exemplary method includes obtaining at at least one of a primary device and a secondary device a media sample related to primary content being viewed on the primary device, generating one or more data signatures from the media sample at the at least one of the primary device and the secondary device, transmitting a request to a server to receive secondary media content that includes one or more signature chunks derived from the primary media content, and determining, at the at least one of the primary device and the secondary device, whether the one or more data signatures match one or more media signatures within the one or more signature chunks, wherein the at least one of the primary device and the secondary device is further configured to take at least one action upon determining that there is a match.

In FIG. 1, an exemplary communication system 100 is provided. In at least some embodiments, the communication system 100 is configured to provide a method for obtaining supplemental information related to viewable media content. The communication system 100 includes a media source 102, a primary device 104, a server device 106, and a secondary device, such as a mobile device 108. The exemplary media source 102 is intended to be representative of any of one or more of various sources of media content 110, such as cable television channels, satellite television channels, Internet video channel feeds, etc., which communicate programming, such as television stations, Internet websites, content-provider websites (which can include social networking websites), etc. The media source 102 communicates the media content 110 via a communication link 105 to one or more primary devices 104, such as a television set or set-top box used in conjunction with a television monitor. The media content 110 is displayed as primary media content 112 for viewing by a user.

The media source 102 communicates the media content 110 to the server 106 via communication link 115. In at least some embodiments, the media content 110 communicated to the server 106 is used by the server 106 to generate secondary media content 113. In at least some other embodiments, the secondary media content 113 can be derived at, or obtained by, a second server (not shown) and communicated to the server 106. The secondary media content 113 includes a signature feed 125 with a plurality of media signatures 128, along with associated program-identification data.

The exemplary server 106 can include one or more of various components capable of receiving the media content 110, of extracting secondary media content 113 from the received media content 110, if not already extracted, of storing the secondary media content 113, and of communicating at least a portion of the secondary media content 113 to the mobile device 108. More particularly, as shown in FIG. 1, the server 106 includes a memory portion 114, a processor portion 116 in communication with the memory portion 114, and one or more input/output interfaces (not shown) for interfacing communication links 115, 117 with the processor portion 116. The processor portion 116 further includes a back-end portion 118 (or Media Content Processor) and a front-end portion 120. The back-end portion 118 communicates with the one or more media sources 102 via the communication link 115, and the front-end portion 120 communicates with the mobile device 108 via the communication link 117. The memory portion 114 can include various types of storage mediums, such as Random-Access Memory, Read-Only Memory, hard drives, disc drives, etc., capable of storing programs for executing the necessary functions of the server 106, as well as the secondary media content 113. Communication between components in the communication system 100 can include both wired and wireless technologies. Although some exemplary communication links have been illustrated in FIG. 1, various other communication links can exist utilizing both wired and wireless connections.

In at least some embodiments, the front-end portion 120 supports pull communications with the mobile device 108. The pull communications can, for example, be implemented using Representation State Transfer architecture of the type typical to the web, and as such, the front-end portion 120 is configured to receive requests for information to be provided to the mobile device 108 at times and circumstances determined by the mobile device 108, in response to which the server 106 searches for and provides requested secondary media content 113, as discussed below. Also, as discussed in further detail below, in at least some embodiments the front-end portion 120 establishes a push channel in conjunction with the mobile device 108.

In at least some such embodiments, the push channel provides media signatures 128 from the server 106 (generated by the front-end portion 120) to the mobile device 108 at times and circumstances that can be determined by the server 106. The push channel can operate in a variety of push modes, such as broadcast mode and multicast mode. More particularly, broadcast mode can include for example, a television broadcast spectrum, a broadcast service on a cellular network (e.g., Multimedia Broadcast Multicast Services), and a portion of the capacity of a cable TV system. In the case of multicast mode, the mobile device would need to request to join a multicast group in order to receive a multicast stream, such as one generated by an Internet Protocol television (IPTV) system through which television services are delivered using an Internet protocol suite over a packet-switched network (e.g., the Internet). Multicast streams can also be generated in the absence of or outside of an IPTV system. Both push modes can be operated using wired or wireless communication.

Figure 2:
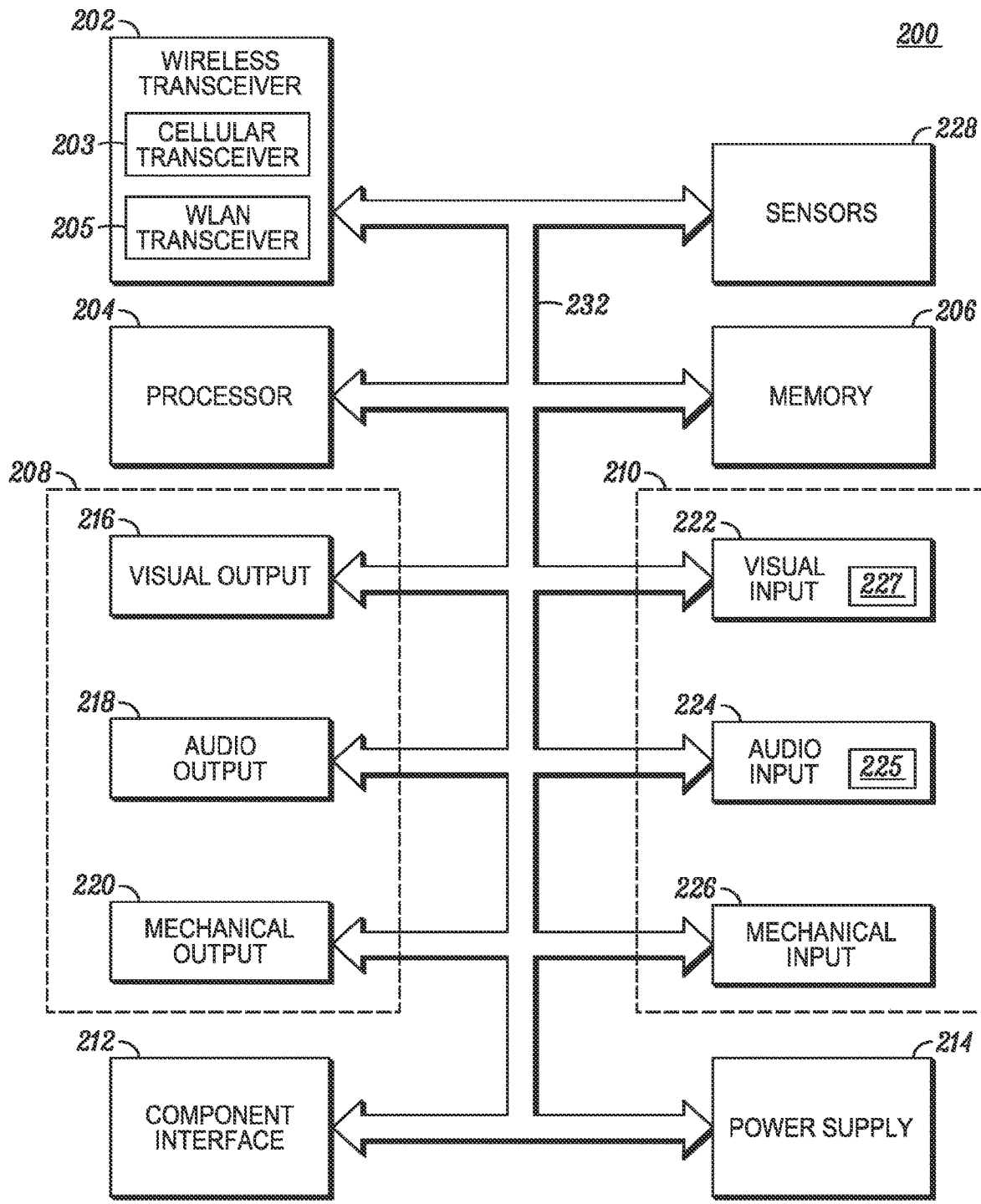
FIG. 2 is a block diagram showing exemplary internal hardware components of a secondary device of FIG. 1.

FIG. 2 is a block diagram illustrating exemplary internal components 200 of a mobile device, such as the mobile device 108, in accordance with the present embodiment. As shown in FIG. 2, the components 200 include one or more wireless transceivers 202, a processor portion 204 (e.g., a microprocessor, microcomputer, application-specific integrated circuit, etc.), a memory portion 206, one or more output devices 208, and one or more input devices 210. In at least some embodiments, a user interface is present that comprises one or more output devices 208, such as a display, and one or more input device 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 108 to be portable. All of the internal components 200 can be coupled to one another, and in communication with one another, by way of one or more internal communication links 232 (e.g., an internal bus).

In the present embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.), or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Thus, although in the present embodiment the mobile device 108 has two of the wireless transceivers 203 and 205, the present disclosure is intended to encompass numerous embodiments in which any arbitrary number of wireless transceivers employing any arbitrary number of communication technologies are present.

Exemplary operation of the wireless transceivers 202 in conjunction with others of the internal components 200 of the mobile device 108 can take a variety of forms and can include, for example, operation in which, upon reception of wireless signals, the internal components 200 detect communication signals and the transceiver 202 demodulates the communication signals to recover incoming information, such as voice or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceivers 202 convey the modulated signals by way of wireless and (possibly wired as well) communication links to other devices such as the server 106 and one or more of the content provider websites 102 (as well as possibly to other devices such as a cell tower, access point, or another server, or any of a variety of remote devices).

Depending upon the embodiment, the input and output devices 208, 210 of the internal components 200 can include a variety of visual, audio, or mechanical outputs. For example, the output devices 208 can include one or more visual-output devices 216 such as a liquid-crystal display and light-emitting diode indicator, one or more audio-output devices 218 such as a speaker, alarm, or buzzer, or one or more mechanical-output devices 220 such as a vibrating mechanism. The visual output devices 216 can include, among other things, a video screen. Likewise, by example, the input devices 210 can include one or more visual-input devices 222 such as an optical sensor (for example, a camera 227), one or more audio-input devices 224 such as a microphone 225, and one or more mechanical-input devices 226 such as a flip sensor, keyboard, keypad, selection button, navigation cluster, touch pad, touchscreen, capacitive sensor, motion sensor, and switch. Actions that can actuate one or more of the input devices 210 can include not only the physical actuation of buttons or other actuators, but can also include, for example, opening the mobile device 108 (if it can take on open or closed positions), unlocking the device 108, moving the device 108 to actuate a motion, moving the device 108 to actuate a location-positioning system, and operating the device 108.

As shown in FIG. 2, the internal components 200 of the mobile device 108 also can include one or more of various types of sensors 228. The sensors 228 can include, for example, proximity sensors (a light-detecting sensor, an ultrasound transceiver, or an infrared transceiver), touch sensors, altitude sensors, a location circuit that can include, for example, a Global Positioning System receiver, a triangulation receiver, an accelerometer, a tilt sensor, a gyroscope, or any other information-collecting device that can identify a current location or user-device interface (carry mode) of the mobile device 108. Although the sensors 228 are for the purposes of FIG. 2 considered to be distinct from the input devices 210, in other embodiments it is possible that one or more of the input devices 210 can also be considered to constitute one or more of the sensors 228 (and vice-versa). Additionally, even though in the present embodiment the input devices 210 are shown to be distinct from the output devices 208, it should be recognized that in some embodiments one or more devices serve both as input devices 210 and output devices 208. For example, in embodiments where a touchscreen is employed, the touchscreen can be considered to constitute both a visual-output device 216 and a mechanical-input device 226.

The memory portion 206 of the internal components 200 can encompass one or more memory devices of any of a variety of forms (e.g., read-only memory, random-access memory, static random-access memory, dynamic random-access memory, etc.) and can be used by the processor 204 to store and retrieve data. In some embodiments, the memory portion 206 can be integrated with the processor portion 204 in a single device (e.g., a processing device including memory or processor-in-memory), albeit such a single device will still typically have distinct sections that perform the different processing and memory functions and that can be considered separate devices.

The data that are stored by the memory portion 206 can include, but need not be limited to, operating systems, applications, and informational data. Each operating system includes executable code that controls basic functions of the communication device 108, such as interaction among the various components included among the internal components 200, communication with external devices via the wireless transceivers 202 or with the component interface 212, and storage and retrieval of applications and data to and from the memory portion 206. Each application includes executable code that utilizes an operating system to provide more specific functionality for the communication device 108, such as file system service and handling of protected and unprotected data stored in the memory portion 206. Informational data are non-executable code or information that can be referenced or manipulated by an operating system or application for performing functions of the communication device 108.

Referring to FIG. 1 again, utilizing the aforementioned components of the communication system 100, a user of the mobile device 108 can access the server 106 to obtain secondary media content 113 related to the media content 110, which can be primary media content 112 viewed on the primary device 104, as well as other information available for multiple programs and channels not being viewed. As discussed above, the secondary media content 113 includes the signature feed 125 which provides one or more media signatures 128. The media signatures 128 can include data structures 129 (e.g., metadata or metadata portions) generated from an audio or video segment or image which are at least partially representative of programs broadcast on a channel over time. The data structures 129 can include visual or audio data identifiers associated with each program. To provide a sampling of the signature feed 125, the signature feed 125 can be time-segmented to form signature chunks 126. A signature chunk 126 includes an aggregation of media signatures 128 for one or more periods of time. The exemplary signature feed 125 illustrated in FIG. 1 includes a plurality of media signatures 128 each representing a program or channel. As shown, a signature chunk 126 is indicated that includes media signatures 128 derived from one or more programs within a particular time interval, such as between time t and time t-A. In this regard, the signature chunk 126 includes time specific data structures for each included channel (program). The time variable A can be chosen based on various criteria, such as available data compression, bandwidth capabilities, desired response speed, etc. For example, choosing a small value for A such as a few seconds makes the number of media signatures 128 in the signature chunk 126 smaller, thus reducing the needed bandwidth for communicating the signature chunk 126 to the mobile device 108. In another example, the time variable A can be based on a maximum amount of delay that is supported for the matching process. For example, assuming Δ=20 minutes, the user could pause the program on the primary device 104 (e.g., a DVR) for up to 20 minutes and still be able to obtain a match when playback is resumed. In another example, the time variable A can be chosen small enough that the signature chunk 126 effectively contains a media signature 128 only for a specific point in time.

The media signatures 128 chosen for inclusion in a particular signature chunk 126 can be selected based on numerous available criteria and based on a prioritization scheme (that can be programmed at the server 106, at the mobile device 108, or elsewhere). For example, the signature chunk 126 can include portions of media signatures 128 for each channel being broadcast, or only for the channels frequently watched by the user, or for specific genres (e.g., sports, sitcoms, movies, etc.). In addition, the signature chunk 126 can include portions of media signatures 128 that are selected based on non-user-specific criteria, such as channels broadcasting programs that are ranked with the highest relative popularity rating. Further, the prioritization scheme can take into account various other criteria not discussed. Additionally, each of the signature chunks 126 can include other information for one or more channels that coincides with the channels represented by the media signatures 128 captured in the signature chunk 126. By selecting more or fewer media signatures and shorter or longer periods, the signature chunks 126 can be varied in size and quantity for a particular time period. In some embodiments, the signature chunks 126 can include all available broadcast channels over a short period of time, while in other embodiments, they can include a limited sampling of channels but over a longer period of time, as well as variations of both time period and channel quantity.

As additionally shown in FIG. 1, the mobile device 108 includes a client application 132 that is intended to be representative of a variety of client applications performing the same or similar functions on any of various types of mobile devices 108, such as mobile phones, tablets, laptops, etc. The client application 132 is a software program that operates on the processor portion 204 and is particularly configured to provide an interface between the mobile device 108 and one or more others of the components of the communication system 100. In addition, the client application 132 governs operation of one or more of the input and output devices 210, 208 (e.g., camera 227, touchscreen, etc.) to provide a visual interface (not shown) that allows a user to initiate a user request-based method for obtaining portions of secondary media content 113 on a secondary device (as discussed in further detail with reference to FIGS. 3 and 4). The client application 132 can take numerous forms and, depending on the embodiment, be configured to operate on, and communicate with, various operating systems and devices. It is to be understood that various processes described herein as performed by the mobile device 108 can be occurring on the client application 132 in particular or on other applications depending on the embodiment.

By utilizing the mobile device 108 with the client application 132, a user can obtain a media sample 134 from the primary media content 112 viewable on the primary device 104 and generate a data signature 130 from it. It should be noted that generally a data signature 130 contains the same type of information included in a media signature, although it is derived from a different source. The media sample 134 can include a video or audio sample obtained with one or more input devices 210 of the mobile device 108. For example, the user can utilize one of the audio input devices 224 (e.g., the microphone 225) to obtain an audio sample of the program. Alternatively, or additionally, the user can utilize one of the visual input devices 222 (e.g., the camera 227) to take a digital photo (snapshot) of a program displayed on the primary device 104. The client application 132 analyzes the media sample 134 to generate one or more data signatures 130. At least one method for generating data signatures is known in the art. For example, a data signature for an audio signal can be based on collecting and encoding information about the times and frequencies of peaks in a spectrogram of a short segment of an audio signal.

Before or after the data signature 130 has been generated, a request is sent to the server 106 for one or more portions of the secondary media content 113 that may correspond to the data signature 130. The secondary media content 113 is provided to the mobile device 108 in the form of one or more of the signature chunks 126, which can be searched to find a match (e.g., a similar signature) for the data signature 130. In addition, the signature chunk 126 can include program ID data for the program that the signature chunk 126 is derived from. The program ID data can include various informational components, such as a program name, a number related to the specific program name or episode, etc. Upon a successful match, various informational components can be provided to the user of the mobile device 108, such as the program ID data, as well as any other associated information related, at least indirectly, to the data signature 130, possibly including time-into-program information. In addition, the client application 132 can communicate the identity of the program being viewed and the related information to the server 106 or to a second server (not shown), such as a third-party server. Although the server 106 can provide the signature chunks 126, once the program being viewed has been identified by the client application 132, the identity of the program and the related information can be withheld from the server 106, in order to maintain the privacy of the user. Instead, the program identity and the related information can be sent to a second server not affiliated with the server 106, which allows the second server to provide services that are related to the program that was identified in the program ID data, without disclosing the private viewing choices of the user to the server 106. In this regard, a user can potentially choose which source he wishes to use to identify programs and which source he wishes to use to obtain additional program-related information.

Figure 3:
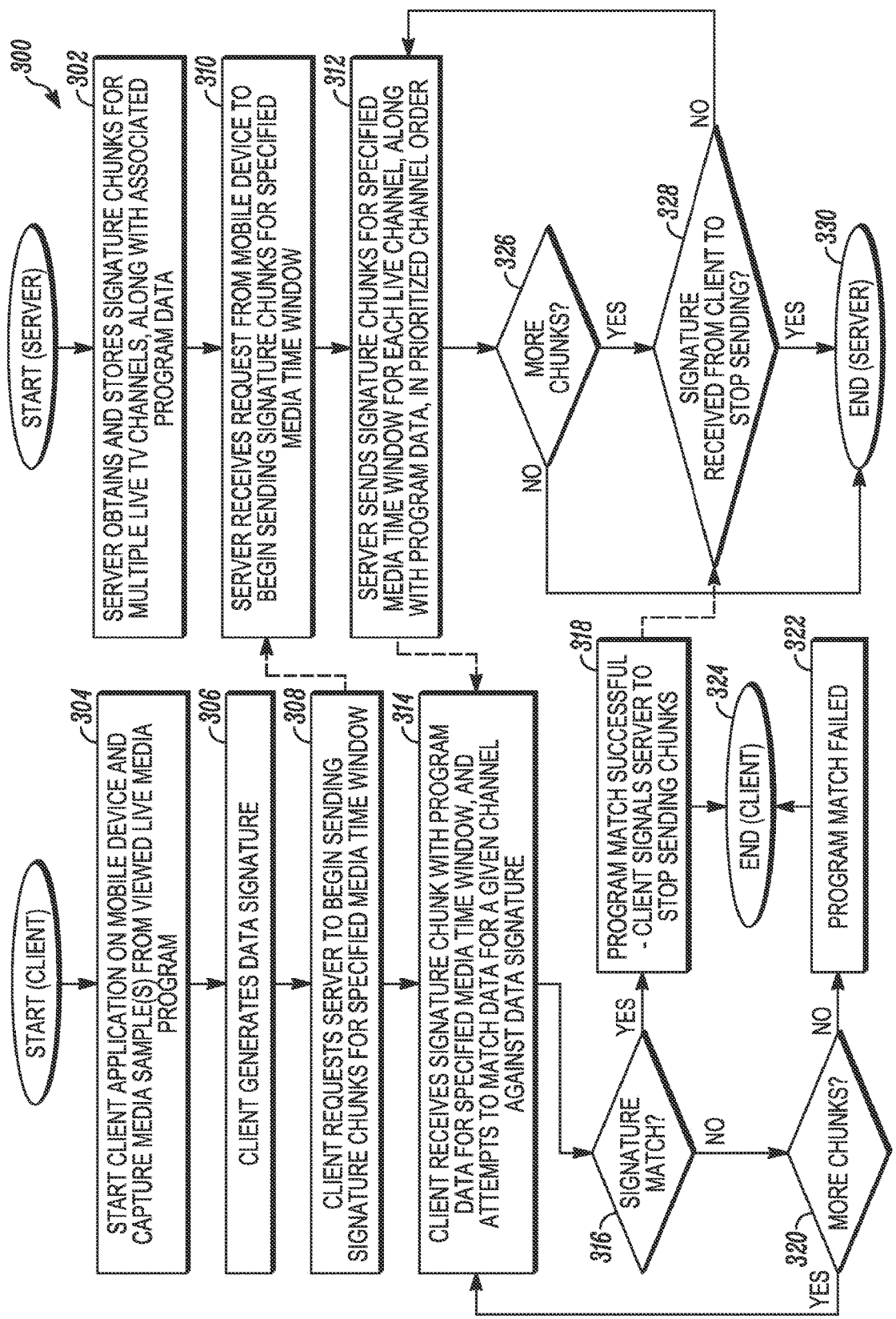
FIG. 3 is a flowchart of an exemplary user request-based method for obtaining secondary media content on a secondary device using the communication system of FIG. 1.

Referring now to FIG. 3, a flowchart 300 is provided that shows an exemplary user request-based method, which can be performed by one more components of the communication system 100 of FIG. 1, for obtaining one or more portions of the secondary media content on a mobile device 108. More particularly, as shown, the method begins at step 302, in which the server 106 obtains and stores one or more signature chunks 126 for multiple live channels broadcasting the media content 110, along with other associated program identification data. The client application 132 is started on the mobile device 108 in step 304, and one or more of the input devices 210 of the mobile device 108 are utilized to capture one or more media samples 134 from a program (a portion of the primary media content 112) being viewed on the primary device 104. In step 306, the client application 132 generates one or more data signatures 130 by analyzing the media sample 134. In at least some embodiments, the action of obtaining the media sample 134 on the mobile device 108 can initiate the starting of the client application 132 and the generation of the data signature 130.

After obtaining the data signature 130, in step 308 the client application 132 communicates a request (e.g., HTTP GET request) to the server 106 to begin sending signature chunks 126. Alternatively, the request can occur before or simultaneous with obtaining data signatures 130 (e.g., triggered by the action of obtaining the media sample 134 or the starting of the client application 132). The request for signature chunks 126 can include a specific media time window to inform the server 106 of the time period for which the media sample 134 was obtained. The inclusion of the media time window allows the server 106 to utilize the prioritization scheme (discussed above) to narrow the scope of the signature chunks 126 to a time period that would likely contain a match for the data signature 130. In at least some embodiments, the media time window defaults to a time period in close proximity to the time the request is received at the server 106, while in other embodiments, alternate methods of selecting a time period, or no time period at all, are provided. One exemplary method of determining the media time window includes the mobile device 108 notifying the server 106 to start media signature generation at t0 (e.g., when the camera 227 is turned on), then a snapshot is taken at t, and the data signature 130 is generated at t+α. The mobile device 108 then requests signature chunks 126 at t+α, and the server 106 delivers signature chunks 126 containing portions of media signatures 128 for the time period t0 to t+α.

The server 106 receives the request for signature chunks 126 in step 310 and begins sending one or more signature chunks 126, along with associated program identification data, to the mobile device 108 in step 312. The mobile device 108 receives the one or more signature chunks 126 with program data for the specified media time window from the server 106 in step 314. In addition, upon receipt of at least one signature chunk 126, the mobile device 108 begins the attempt to match the portions of each media signature 128 in the signature chunk 126 with the data signature 130. In step 316, if a match is found, then the process moves to step 318, where the mobile device 108 signals to the server 106 to stop sending signature chunks 126.

If in the step 316 a match was not found from the first analyzed signature chunk 126, then in step 320 it is determined if additional signature chunks 126 have been received. If no more signature chunks 126 are available to be analyzed, then the process moves to step 322 where the mobile device 108 provides an indication that no match was found. From step 318 and step 322, the process can terminate at a step 324. Optionally, the process could return to step 314 periodically to receive additional signature chunks 126 that can be available later. Alternatively or additionally, the process could return to step 304 where a request is provided to the user of the mobile device 108 to obtain an updated data signature 130 and repeat the process.

Returning to step 312, regarding the transmission of signature chunks 126 from the server 106 to the mobile device 108, the selection and quantity of signature chunks 126 for transmission to the mobile device 108, as well as the frequency, can vary substantially based on numerous chosen criteria. Such criteria can be included at least in part in the prioritization scheme. For example, the signature chunks 126 can be sent periodically until a match is found at the mobile device 108 and a signal is received from the mobile device 108 to cease transmission (step 318). At step 326, the server 106 can check if any unsent signature chunks 126 are available. If not, then the process on the server side can terminate at step 330. If additional signature chunks 126 are determined to be available, then the process continues to step 328. In step 328, the server 106 checks if a request from the mobile device 108 has been received to stop sending signature chunks 126. If a request has been received, then the process terminates at step 330. If the server 106 has not received a request from the mobile device 108 to cease sending signature chunks 126, then the process can return to step 312. Although not shown in the flowchart 300, a service tied to the program that is identified with the data signature 130 can be launched on the mobile device 108 upon the determination of a match. For example, program identification information obtained by the match can be automatically or selectively chosen (by the user) for communication to a separate entity (e.g., a web-server) (not shown), which could be ad-based, information-based, channel-based, network-based, etc.

Figure 4:
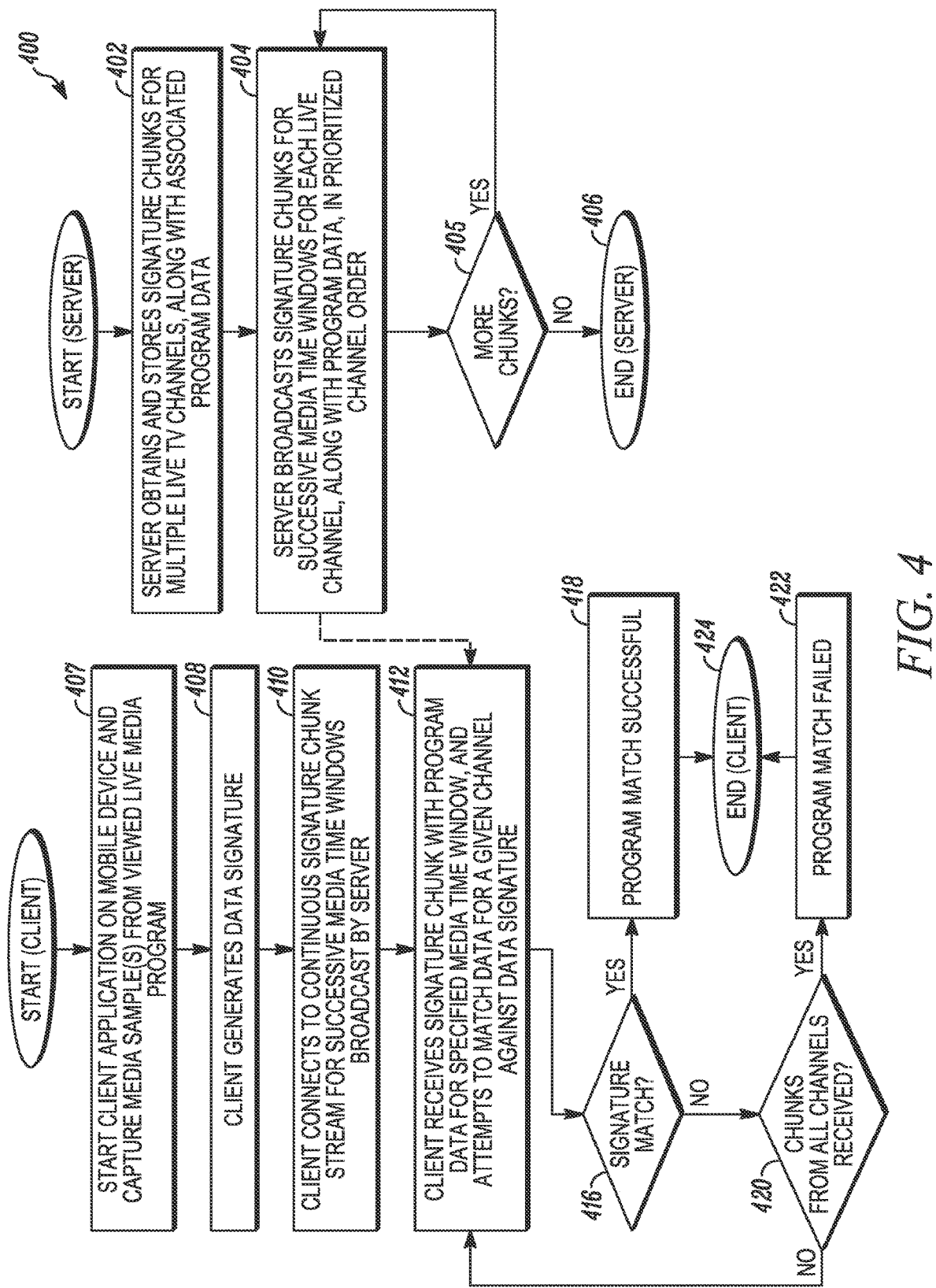
FIG. 4 is a flowchart of an exemplary broadcast-oriented method for obtaining secondary media content on a secondary device using the communication system of FIG. 1.

In order to reduce the processing load on the server 106, the server 106 can wait to obtain secondary media content 113, or at least wait to derive the signature chunks 126, until activation of the client application 132 has been detected, wherein activation of the client application 132 initiates an activation command to the server 106. Using this method, the signature chunks 126 generated can be tailored to the user, as even nominal information can be provided along with the activation command, such as time, geographic location, preferences, prioritization scheme, etc. Referring to FIG. 4, a flowchart 400 is provided that shows another exemplary method, which can be performed by one more components of the communication system 100 of FIG. 1, for obtaining one or more portions of the secondary media content on a mobile device 108. Various modifications or additions to the steps discussed above with reference to flowchart 300 can be included as modifications or additions to the steps below, including utilizing prioritizing schemes. Flowchart 400 can differ from the user request-based method above in various ways. For example, in place of transmitting one or more signature chunks 126 only upon request and only for a specified media time window, the server 106 can push (e.g., broadcast) a stream of signature chunks 126 (with associated identification program data) that represent each live channel (media content 110) in prioritized channel order, for successive media time windows. More particularly, an exemplary broadcast stream of signature chunks 126 can include media signatures 128 derived from a first program within the interval of time=t (e.g., the present time) through time=t−Δ, media signatures 128 derived from a second program within the interval of time=t through time=t−Δ, and so on. Signature chunks 126 may also include media signatures 128 derived from one or more programs within other time intervals, such as media signatures 128 derived from the second program within the interval of time=t−Δ1 and time=t−Δ1−Δ2.

Referring still to flowchart 400, as shown, the method begins at step 402, in which the server 106 obtains and stores media signatures 128 for multiple live channels broadcasting media content 110, along with associated identification program data. In step 404, the server 106 broadcasts the signature chunks 126 for successive media time windows for each live channel, along with program data, in prioritized channel order, although various other prioritizing schemes can be utilized, as discussed above. In step 405, the process server 106 queries if additional signature chunks 126 are available for broadcasting. If yes, then the process returns to step 404 and resumes broadcasting. If no, then the process ends at step 406. Step 404 can be reinitiated based on various criteria, such as a predetermined waiting period, or a specific time marker, such as on the hour or half-hour, when programming typically changes on a channel. The broadcasting of signature chunks 126 can be continuous as desired, such that whenever the mobile device 108 seeks to connect to the broadcast of signature chunks 126, the information is available.

With reference to the mobile device 108, the client application 132 is started on the mobile device 108 in step 407. In addition, in step 407 one or more input devices 210 of the mobile device 108 are utilized to capture a media sample 134 from a program being viewed on the primary device 104. In step 408, the client application 132 generates one or more data signatures 130 by analyzing the media sample 134. After obtaining the data signature 130, in step 410 the mobile device 108 accesses the stream of signature chunks 126 that are broadcast from the server 106. In at least some embodiments, the mobile device 108 can start buffering broadcast signature chunks 126 even before obtaining the data signatures 130. In step 412, the mobile device 108 receives the first signature chunk 126 from the server 106 with program data for the media time windows centered around the current time. Further, in step 412, upon receipt of at least one signature chunk 126, the mobile device 108 attempts to match the data signature 130 with a portion of a media signature 128 from the signature chunk 126. In step 416, if a match is found, then the process moves to step 418, where the additional program data associated with the media signature 128 are provided to the user, thereby providing identification of the program that was viewed by the user. Finally, the process ends at step 424. Further, other additional program data can be included in addition to the program identification, such as cast information, episode details, etc.

If in step 416 a match was not found from the first analyzed signature chunk 126, then the process moves to step 420, where a query is made to ascertain if all signature chunks 126 have been received for all channels currently broadcasting. If the answer is no, then the process returns to step 412 to continue receiving signature chunks 126 and seeking a match for the data signature 130. If in step 420 it is determined that all signature chunks 126 have been received for all channels currently broadcasting, then the process advances to step 422 where the user is notified that the program cannot be matched and then to step 424 where the process ends. In at least some embodiments, if no match is found on the mobile device 108 at step 422, then the data signature 130 can be uploaded to the server 106 for comparison to an expanded scope of signature chunks 126 that can include expanded media time windows or programs.

A user can utilize the system to provide initial identification of media content 110, and in addition, the system can be configured to continue to monitor for a change in the primary media content 112 being viewed. More particularly, when a user changes a channel for example, the channel change can be detected and the information being provided to the mobile device 108 can be updated to relate to the current primary media 110 being viewed by the user. Upon successfully matching the data signature 130 with a media signature 128, the mobile device 108 has synchronized with the primary media content 112 on the primary device 104. Once synchronized, the server 106 can send continuous or periodic media signatures 128 for a plurality of channels to the mobile device 108. In broadcast mode, for example, the server 106 is continuously sending out media signatures 128 for a plurality channels. To provide current data signatures 130 for the program being viewed, the mobile device 108 can obtain periodic audio-based or video-based media samples 134 via the microphone 225 or the camera 227 and then generate updated associated data signatures 130. As noted above, the updated data signatures 130 can be periodically or continuously compared with the media signatures 128 to identify if the channel that was initially detected has been changed. To increase efficiency the updated data signatures 130 are first compared with updated media signatures 128 related to the initial channel detected. If no match is found, then the data signatures 130 can be compared against the media signatures 128 for other channels to identify the new channel. If a new match is found, then the new program ID data, which can include related information such as time-into-program, is provided to the user or to a server providing services related to the program identified.

The television set and set-top box referenced above as primary devices 104, in at least some embodiments, can additionally or alternatively include software similar to the client application 132, which allows the primary device 104 to interface with the communication system 100 in a manner as described above with reference to the mobile device 108. In this regard, a television set or set-top box can use the aforementioned methods to identify the program being outputted by the television set or set-top box and provide continued monitoring and information updates. Program identification and associated services can be provided by the mobile device 108 or the primary device 104.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A method for presenting secondary content associated with media content, the method comprising:
   transmitting, from a mobile device to a server, a request for one or more portions of secondary media content, wherein the request includes a time period corresponding to a media sample of a media content item being presented on a media device;
   receiving, at the mobile device, the one or more portions of secondary media content, wherein the one or more portions of secondary media content are relevant to the media content item being presented on the media device at the time period corresponding to the media sample; and
   causing information associated with the one or more portions of secondary media content to be presented at the mobile device.

2. The method of claim 1, wherein the information associated with the one or more portions of secondary media content includes cast information associated with the media content item.

3. The method of claim 1, wherein the information associated with the one or more portions of secondary media content includes episode details associated with the media content item.

4. The method of claim 1, wherein the request for one or more portions of secondary media content is transmitted in response to a request received, at the mobile device, via a user interface presented on the mobile device.

5. The method of claim 1, further comprising transmitting, from the mobile device to a second server, identifying information associated with the media content item, wherein the second server is configured to provide additional services related to the media content item.

6. The method of claim 1, further comprising:
   determining that presentation of media content has changed from the media content item to a second media content item; and
   in response to determining that presentation of the media content has changed from the media content item to the second media content item, determining identifying information of the second media content item.

7. The method of claim 1, further comprising:
   determining a signature associated with the media content item being presented; and determining an identity of the media content item based on the signature.

8. The method of claim 7, wherein a size of the signature is determined based on a bandwidth of a network connection to the server.

9. The method of claim 1, wherein the one or more portions of secondary media content are relevant to the media content item being presented on the media device at a time prior to when the media sample was obtained.

10. A system for presenting secondary content associated with media content, the system comprising:
a memory; and
a hardware processor that, when executing computer-executable instructions stored in the memory:
transmits, from a mobile device to a server, a request for one or more portions of secondary media content, wherein the request includes a time period corresponding to a media sample of a media content item being presented on a media device;
receiving, at the mobile device, the one or more portions of secondary media content, wherein the one or more portions of secondary media content are relevant to the media content item being presented on the media device at the time period corresponding to the media sample; and
causing information associated with the one or more portions of secondary media content to be presented at the mobile device.

11. The system of claim 10, wherein the information associated with the one or more portions of secondary media content includes cast information associated with the media content item.

12. The system of claim 10, wherein the information associated with the one or more portions of secondary media content includes episode details associated with the media content item.

13. The system of claim 10, wherein the request for one or more portions of secondary media content is transmitted in response to a request received, at the mobile device, via a user interface presented on the mobile device.

14. The system of claim 10, wherein the hardware processor further transmit, from the mobile device to a second server, identifying information associated with the media content item, wherein the second server is configured to provide additional services related to the media content item.

15. The system of claim 10, wherein the hardware processor further:
determines that presentation of media content has changed from the media content item to a second media content item; and
in response to determining that presentation of the media content has changed from the media content item to the second media content item, determines identifying information of the second media content item.

16. The system of claim 10, wherein the hardware processor further:
determines a signature associated with the media content item being presented; and
determines an identity of the media content item based on the signature.

17. The system of claim 16, wherein a size of the signature is determined based on a bandwidth of a network connection to the server.

18. The system of claim 10, wherein the one or more portions of secondary media content are relevant to the media content item being presented on the media device at a time prior to when the media sample was obtained.

19. A non-transitory computer-readable medium containing computer executable instructions that, when executed by a processor, cause the processor to perform a method for presenting secondary content associated with media content, the method comprising:
transmitting, from a mobile device to a server, a request for one or more portions of secondary media content, wherein the request includes a time period corresponding to a media sample of a media content item being presented on a media device;
receiving, at the mobile device, the one or more portions of secondary media content, wherein the one or more portions of secondary media content are relevant to the media content item being presented on the media device at the time period corresponding to the media sample; and
causing information associated with the one or more portions of secondary media content to be presented at the mobile device.

* * * * *